Oct. 2, 1928.
C. ACHENBACH
HEAD CHECK
Filed Oct. 1, 1927
1,686,060
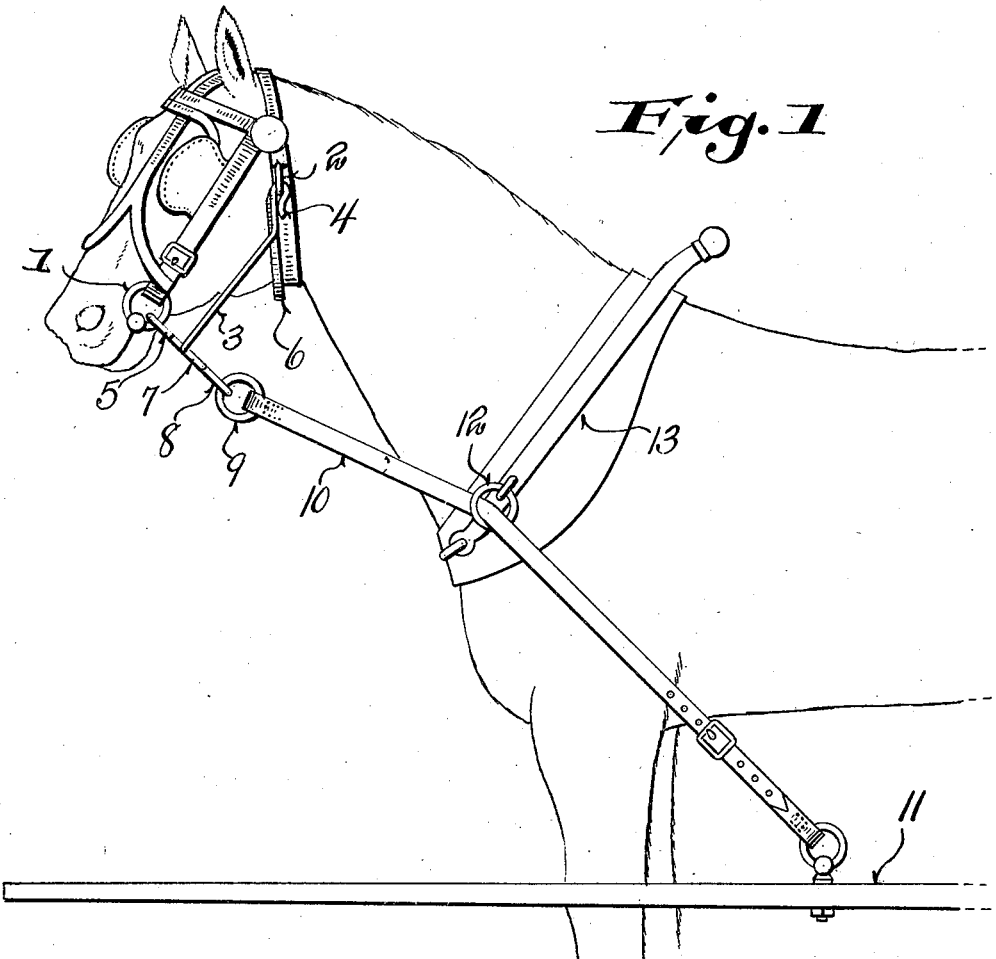
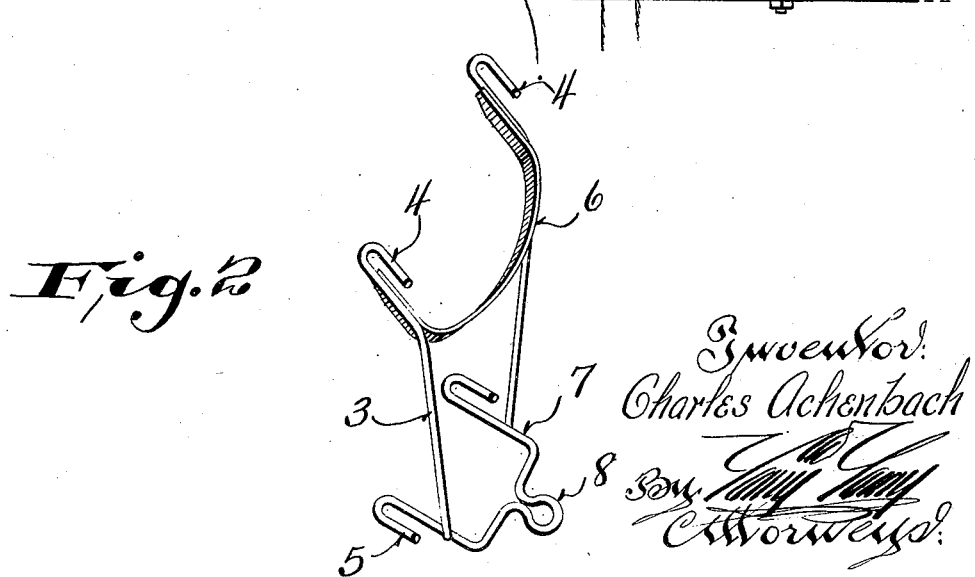

Patented Oct. 2, 1928.

1,686,060

UNITED STATES PATENT OFFICE.

CHARLES ACHENBACH, OF MANITOWOC, WISCONSIN.

HEAD CHECK.

Application filed October 1, 1927. Serial No. 223,390.

This invention pertains to a harness, and has primarily for its object to provide simple, inexpensive and efficient means for preventing one animal of a double team from pulling ahead of its mate.

In the majority of instances where horses are driven double, one is faster than the other and will therefore pull ahead. To hold the fast horse is a very hard and difficult task for the driver, often causing a loss of patience which results in irritating the animal, thereby increasing its tendency to pull ahead of its mate. Further, a stubborn animal if allowed any yield whatever, will immediately take advantage of the same. It is therefore important and essential that a fast or high-strung, nervous animal be firmly held in a predetermined position with relation to its mate, without any effort on the part of the driver.

To overcome this condition a large number of bits of various structures have been devised, but the majority of these are severe and inhuman, and usually result in mutilating the animal's mouth, and causing no beneficial results.

This invention therefore has for one of its objects to overcome the foregoing difficulties by the provision of a simple and efficient check adapted to firmly hold both horses of a double team in proper position, and at the same time eliminate the necessity for harsh and inhuman bits, with resulting abuse to the animal and severe strain and fatigue to the driver.

Incidental to the foregoing, a further object is to provide a check adapted to be carried by the bridle and bit, and secured to the pole, or any other suitable portion of a vehicle, or implement.

Another object is to provide a check adapted to draw the mouth of an animal rearwardly when tension is exerted thereon.

A more specific object is to provide a check adapted to have a leverage action upon the head of an animal should it exert any force thereon.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1 is a side elevation showing a check constructed in accordance with the present invention attached to a horse and a portion of a vehicle or implement.

Figure 2 is a perspective view of the head check detached from the rest of the harness.

Referring now more particularly to the accompanying drawings, the invention is shown attached to the usual head gear or bridle, which is provided with conventional bit rings 1 and check rein rings 2. Primarily, the present invention consists of a head frame comprising a pair of spaced bars 3, the upper ends of which terminate in hooks 4 adapted to engage the rings 2 carried by the throat piece of the bridle. The upper ends of the bars 3 are connected by a curved metal strap 6 adapted to straddle the throat of the animal and hold the upper ends of the bars in spaced relation.

The lower ends of the bars 3 are welded or otherwise secured to a yoke 7, the forward ends of which terminate in the hooks 5 that engage the bit rings 1. The yoke 7 is further provided with an eyelet 8 for the reception of the ring 9 to which a check strap 10 is secured. The strap 10 is thereafter passed through a ring 12 carried by the collar hame 13. The other end of the strap 10 is secured to the vehicle pole 11, or in the event that the team is to be used on an implement which is not provided with a pole, then the strap may be secured to any stationary part of such implement.

From the foregoing it will be seen that a very simple check has been provided which may be readily attached to the conventional type of harness without alteration or extra straps, and due to the fact that the head check is connected to a stationary part of a vehicle or implement, it will be readily seen that an animal may thus be firmly held in any predetermined position, the strap 10 being provided with a buckle to permit the desired adjustment. Should the animal endeavor to pull ahead, the obvious action of the check is to draw the mouth rearwardly, and force the throat strap 6 against the jaw of the animal, thus exerting a leverage action which prevents the animal from getting the bit in its teeth. Also, inasmuch as the yoke 7 extends to the rear of the mouth and holds the bars 3 in spaced relation, the check can be worn by the animal without annoyance.

By actual demonstration of the present invention it has been found that the same eliminates all necessity for severe and inhuman bits which merely mutilate the mouth of the animal, thus increasing its irritability and tendency to pull ahead. In several actual cases numerous high-strung horses have been broken of this tendency after wearing the check for a very short period, as an animal readily realizes that it can accomplish nothing pulling against the check, and therefore quickly reconciles itself to pulling in the proper position with relation to its mate, it being well-known that an animal will not pull a load on its mouth.

I claim:—

1. An animal check comprising a pair of spaced bars having means adjacent their upper ends for attachment to a bridle or headgear, a metal strap connecting the upper ends of said bars, a yoke carried by the lower ends of said bars, and a strap for connecting said yoke to a stationary bar of a vehicle or implement.

2. An animal check comprising a pair of spaced side bars having means at their upper ends for attachment to a bridle or headgear, a U-shaped yoke carried by the lower ends of said spaced bars for attachment to the bridle bit, said yoke having an eyelet for the reception of a strap, and a strap for connecting said eyelet to a stationary part of a vehicle or implement.

3. An animal check comprising a pair of spaced bars having hooks at their upper ends, a metal strap joining the upper ends of said bars, a yoke having its arms secured to the lower ends of said uprights and having hooks at the forward ends of its arms, and a strap for connecting said yoke with a stationary part of a vehicle or implement.

In testimony that I claim the foregoing I have hereunto set my hand at Manitowoc, in the county of Manitowoc and State of Wisconsin.

CHARLES ACHENBACH.